United States Patent
Ishizaki (10) Patent No.: US 8,527,579 B2
(45) Date of Patent: Sep. 3, 2013

(54) SERVER DEVICE AND SETTING INFORMATION SHARING METHOD

(75) Inventor: Tomonori Ishizaki, Kanagawa (JP)

(73) Assignee: Sony Corporation, Tokyo (JP)

(*) Notice: Subject to any disclaimer, the term of this patent is extended or adjusted under 35 U.S.C. 154(b) by 506 days.

(21) Appl. No.: 12/717,510

(22) Filed: Mar. 4, 2010

(65) Prior Publication Data

US 2010/0235436 A1 Sep. 16, 2010

(30) Foreign Application Priority Data

Mar. 13, 2009 (JP) ............................ P2009-061774

(51) Int. Cl.
*G06F 15/16* (2006.01)

(52) U.S. Cl.
USPC ........................................................ 709/203

(58) Field of Classification Search
USPC .................. 709/220, 221, 223, 229, 203, 214; 707/102, 201, 827; 345/735, 589; 455/3.01, 455/502
See application file for complete search history.

(56) References Cited

U.S. PATENT DOCUMENTS

| | | | | |
|---|---|---|---|---|
| 5,553,242 A * | 9/1996 | Russell et al. | ................ | 709/227 |
| 6,760,755 B1 * | 7/2004 | Brackett | ........................ | 709/214 |
| 7,149,813 B2 * | 12/2006 | Flanagin et al. | ............. | 709/248 |
| 7,277,408 B2 * | 10/2007 | Sorsa | ............................ | 370/328 |
| 7,620,741 B2 * | 11/2009 | Torudbakken et al. | ........... | 710/2 |
| 7,685,253 B1 * | 3/2010 | Valia | ............................ | 709/217 |
| 7,774,464 B2 * | 8/2010 | Vuori et al. | .................... | 709/225 |
| 7,784,031 B1 * | 8/2010 | Borg et al. | .................... | 717/121 |
| 7,836,158 B2 * | 11/2010 | Kasatani | ....................... | 709/220 |
| 2001/0049719 A1 * | 12/2001 | Nakajima | ..................... | 709/203 |
| 2002/0046265 A1 * | 4/2002 | Suzuki | .......................... | 709/220 |
| 2003/0101329 A1 * | 5/2003 | Lahti et al. | ........................ | 712/1 |
| 2003/0135541 A1 * | 7/2003 | Maeda et al. | .................. | 709/202 |
| 2004/0010795 A1 * | 1/2004 | Sasaki et al. | ................... | 719/321 |
| 2004/0019670 A1 * | 1/2004 | Viswanath | ..................... | 709/223 |
| 2004/0085348 A1 * | 5/2004 | Wang | ............................. | 345/735 |
| 2004/0098450 A1 * | 5/2004 | Rocchetti et al. | ............. | 709/203 |
| 2005/0091346 A1 * | 4/2005 | Krishnaswami et al. | ..... | 709/220 |
| 2005/0278723 A1 * | 12/2005 | Feinleib et al. | ............... | 719/310 |
| 2006/0026281 A1 * | 2/2006 | Hodgson et al. | .............. | 709/224 |
| 2006/0036733 A1 * | 2/2006 | Fujimoto et al. | .............. | 709/225 |

(Continued)

FOREIGN PATENT DOCUMENTS

| | | |
|---|---|---|
| JP | 2002-051058 | 2/2002 |
| JP | 2007-157072 | 6/2007 |

(Continued)

*Primary Examiner* — Imad Hussain (74) *Attorney, Agent, or Firm* — Finnegan, Henderson, Farabow, Garrett & Dunner, LLP (57) ABSTRACT

A server device is provided which includes a change unit for changing setting information of a function shared with a client connected via a network, a transmission unit for transmitting to the client a change notification of the setting information of the function when the setting information of the function has been changed by the change unit, a reception unit for receiving from the client device information of the client to which the change notification of the setting information of the function has been transmitted from the transmission unit, a comparison unit for comparing the device information of the client received by the reception unit with device information of the server device, and a creation unit for creating, based on a comparison result of the device information by the comparison unit, a common file including the changed setting information of the function.

13 Claims, 6 Drawing Sheets

(56) References Cited

U.S. PATENT DOCUMENTS

| | | | |
|---|---|---|---|
| 2006/0059265 A1* | 3/2006 | Keronen | 709/228 |
| 2006/0221093 A1* | 10/2006 | Holub | 345/589 |
| 2006/0294209 A1* | 12/2006 | Rosenbloom et al. | 709/220 |
| 2007/0016682 A1* | 1/2007 | Hodgson | 709/228 |
| 2007/0183678 A1* | 8/2007 | Sankar et al. | 382/254 |
| 2007/0281721 A1* | 12/2007 | Lee et al. | 455/502 |
| 2007/0283049 A1* | 12/2007 | Rakowski et al. | 709/246 |
| 2008/0077698 A1* | 3/2008 | Landers, Jr. | 709/229 |
| 2008/0147827 A1* | 6/2008 | Morris | 709/220 |
| 2008/0162629 A1* | 7/2008 | Ashida et al. | 709/203 |
| 2009/0083401 A1* | 3/2009 | Son et al. | 709/220 |
| 2009/0109871 A1* | 4/2009 | Ho et al. | 370/254 |
| 2009/0130971 A1* | 5/2009 | Piekarski | 455/3.01 |
| 2009/0157802 A1* | 6/2009 | Kang et al. | 709/203 |
| 2009/0172005 A1* | 7/2009 | LaToza et al. | 707/102 |
| 2009/0271447 A1* | 10/2009 | Shin et al. | 707/201 |
| 2010/0082792 A1* | 4/2010 | Johnson | 709/223 |
| 2010/0131625 A1* | 5/2010 | Dehaan et al. | 709/221 |
| 2010/0185730 A1* | 7/2010 | Sebastian | 709/204 |
| 2010/0250634 A1* | 9/2010 | Torii et al. | 707/827 |
| 2011/0320600 A1* | 12/2011 | Froeding et al. | 709/225 |
| 2012/0042011 A1* | 2/2012 | Vendrow et al. | 709/203 |

FOREIGN PATENT DOCUMENTS

| | | |
|---|---|---|
| JP | 2007-180690 | 7/2007 |
| JP | 2007-324941 | 12/2007 |
| JP | 2008-22767 | 2/2008 |
| JP | 2008-227678 | 9/2008 |
| JP | 2009-253392 | 10/2009 |
| JP | 2010-141677 | 6/2010 |

\* cited by examiner

```
<?xml?>

<configuration_list>
  <configuration>
    <profile>
<level>common</level>
</profile>
    <name>back light</name>
    <type>range</type>
    <min_value>0</min_value>
    <max_value>100</max_value>
    <value>40</value>
  </configuration>

<configuration>
    <profile>
<level>vendor</level>
<vendor>sony</vendor>
</profile>
    <name>power saving</name>
    <type>selection</type>
    <selection_list>
      <selection_item>hight</selction_item>
      <selection_item>mid</selection_item>
      <selection_item>low</selection_item>
    </selection_list>
    <value>mid</value>
</configuration_list>
```

SERVER DEVICE AND SETTING INFORMATION SHARING METHOD

BACKGROUND OF THE INVENTION

1. Field of the Invention

The present invention relates to a server device and a setting information sharing method, particularly to a server device and a setting information sharing method capable of sharing the setting information of functions among devices having different functions.

2. Description of the Related Art

In recent years, it has become common for a user to have a plurality of devices such as a PC and a television receiving device and to connect these devices via a network or the like. It is proposed to share the setting information of each device via a network or a setting file when a user has a plurality of television receiving devices, for example.

For example, a method of sharing settings via a setting file is disclosed in Japanese Unexamined Patent Application Publication No. 2008-227678. In the Japanese Unexamined Patent Application Publication No. 2008-227678, the settings of a television receiving device is stored in an external memory in the form of image file, and the image file is displayed on another television receiving device. This enables the settings to be easily shared among a plurality of television receiving devices.

SUMMARY OF THE INVENTION

However, in the Japanese Unexamined Patent Application Publication No. 2008-227678, devices for performing sharing are presumed to have the same function. Accordingly, it was difficult to share the settings when a plurality of devices differ in function due to the difference in manufacturer or model type. Then, the present invention has been made in view of the above issues, and it is desirable to provide a server device and a setting information sharing method which are novel and improved, and which are capable of easily sharing settings among the devices having different functions.

According to an embodiment of the present invention, there is provided a server device including a change unit for changing setting information of a function shared with a client connected via a network, a transmission unit for transmitting to the client a change notification of the setting information of the function when the setting information of the function has been changed by the change unit, a reception unit for receiving from the client device information of the client to which the change notification of the setting information of the function has been transmitted from the transmission unit, a comparison unit for comparing the device information of the client received by the reception unit with device information of the server device, and a creation unit for creating, based on a comparison result of the device information by the comparison unit, a common file including the changed setting information of the function. The transmission unit transmits to the client the common file created by the creation unit.

According to the above configuration, the server device transmits the setting information of the function which has been changed by the server device and receives the device information from the client. Then, the server device compares the device information of the client with the device information of the server device and can create, based on the comparison result of the device information, the common file including the changed setting information of the function. This enables settings to be easily shared among devices having different device information.

Moreover, the client may optimize the setting information of the function of the client based on the changed setting information of the function which is included in the common file transmitted from the transmission unit.

The creation unit may create the common file corresponding to a setting level defined based on the comparison result of the device information by the comparison unit.

The setting level may include a setting level common among different devices, a setting level common among devices of the same vendor, or a setting level common among the same device models.

The creation unit may describe the changed setting information of the function in XML and may create the common file.

The creation unit may describe the setting level in a profile node of XML.

According to another embodiment of the present invention, there is provided a setting information sharing method comprising the steps of changing setting information of a function shared with a client connected via a network, transmitting to the client a change notification of the setting information of the function when the setting information of the function has been changed by the step of changing the setting information, receiving from the client setting information of a function of the client corresponding to the setting information of the function which has been transmitted, comparing the changed setting information of the function with the setting information of the function of the client, creating a common file including the changed setting information of the function in the case where the changed setting information of the function and the setting information of the function of the client are different as a result of comparison at the step of comparing, and transmitting the created common file to the client.

According to another embodiment of the present invention, there is provided a program for causing a computer to function as a server device comprising a change unit for changing setting information of a function shared with a client connected via a network, a transmission unit for transmitting to the client a change notification of the setting information of the function when the setting information of the function has been changed by the change unit, a reception unit for receiving from the client device information of the client to which the change notification of the setting information of the function has been transmitted from the transmission unit, a comparison unit for comparing the device information of the client received by the reception unit with device information of the server device, and a creation unit for creating, based on a comparison result of the device information by the comparison unit, a common file including the changed setting information of the function. The transmission unit transmits to the client the common file created by the creation unit.

According to the embodiments of the present invention as described above, settings can be easily shared even among devices having different functions.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"Detailed description of the embodiment" will be described in the following order.

[1] Object of the present embodiment
[2] Outline of setting information sharing system
[3] Hardware configuration of server device
[4] Functional configuration of server device
[5] Setting information sharing method

[1] Object of the Present Embodiment

First, the object of the present embodiment will be described. In recent years, it has become common for a user to have a plurality of devices such as a PC and a television receiving device and to connect these devices via a network or the like. For example, it is proposed to share the setting information of each device via a network or a setting file when a user has a plurality of television receiving devices.

For example, a method of sharing settings via a setting file is disclosed in Japanese Unexamined Patent Application Publication No. 2008-227678. In the Japanese Unexamined Patent Application Publication No, 2008-227678, the settings of a television receiving device is stored in an external memory in the form of image file, and the image file is displayed on another television receiving device. This enables settings to be easily shared among a plurality of television receiving devices.

However, in the method described above, devices for performing sharing are presumed to have the same function. Accordingly, it was difficult to share settings when the devices for sharing the settings have different functions. Accordingly, considering the above-mentioned situation, a setting information sharing system 1 according to an embodiment of the present invention has been made. According to the setting information sharing system 1 according to the present embodiment, settings can be easily shared even among devices having different functions.

[2] Outline of Setting Information Sharing System

Figure 1:
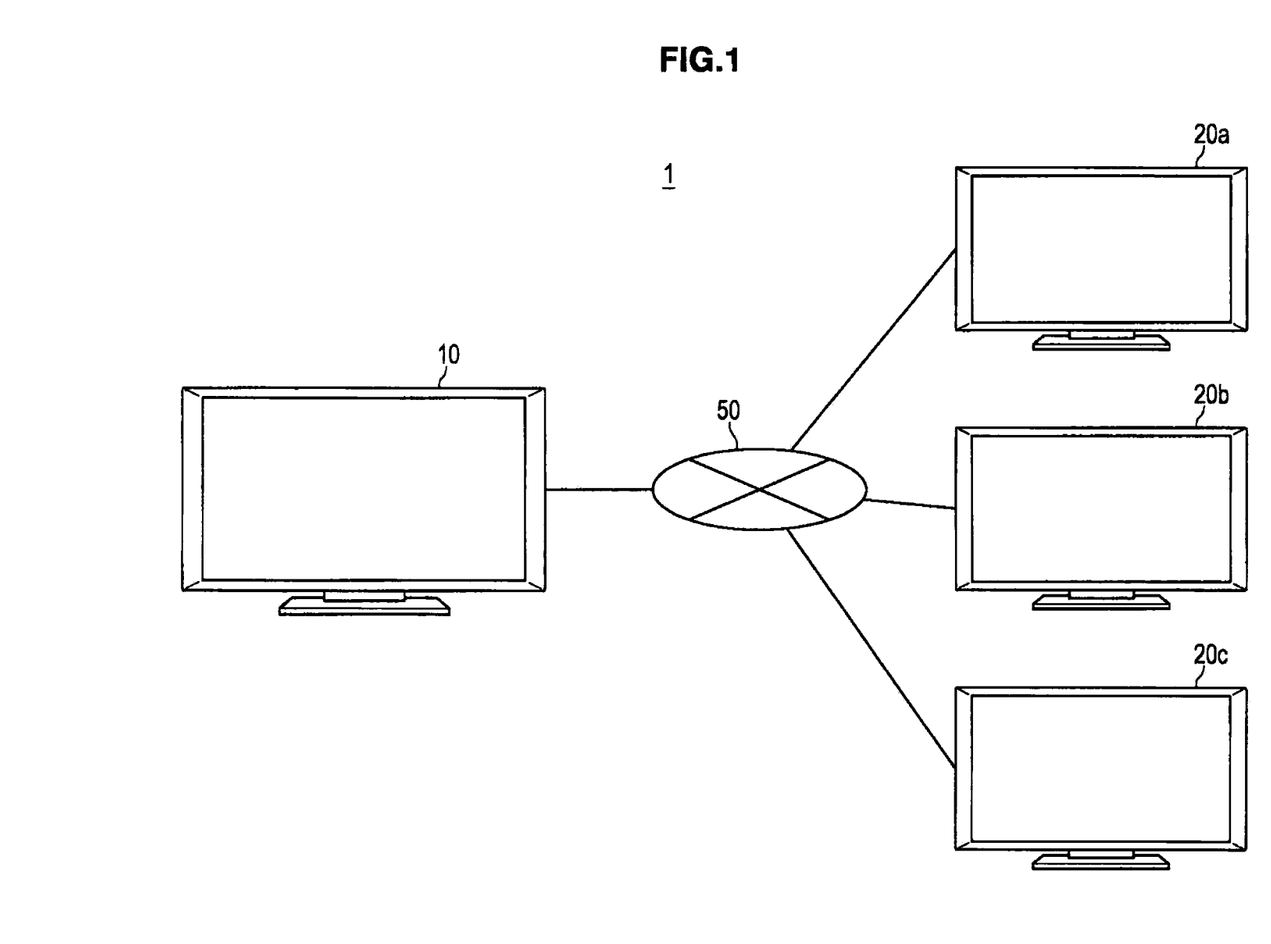
FIG. 1 is an explanatory diagram for explaining an outline of a setting information sharing system according to an embodiment of the present invention.

Next, an outline of the setting information sharing system 1 according to the embodiment of the present invention will be described with reference to FIG. 1. FIG. 1 is an explanatory diagram for explaining the outline of the setting information sharing system 1 according to the embodiment. As shown in FIG. 1, the setting information sharing system 1 includes a server device 10, clients 20a, 20b, and 20c (each of them will be also referred to as "client 20" hereinafter), and a network 50.

The network 50 may include a wire cable such as a copper wire cable or an optical fiber cable, a transmission path of data such as a radio wave, and a data relay device such as a router or a base station for controlling communication.

The server device 10 is connected with the client 20 via a network and has a function of transmitting the setting information of the server device 10 to the client 20 and notifying the client 20 of a change in the setting information. This enables sharing of the setting information among the server device 10 and the client 20. The sharing of the setting information among the server device 10 and the client 20 will be described in detail later. The server device 10 may be exemplified by a television receiving device, a computer device (including notebook type and desktop type) such as a personal computer, and PDA, for example.

The client 20 is connected with the server device 10 via the network and has a function of receiving the setting information of the server device 10 and changing the setting information of the client 20 based on the received setting information. The client 20 may be exemplified by a television receiving device, a computer device (including notebook type and desktop type) such as a personal computer, and PDA, for example.

In the present embodiment, description will be made with the server device 10 and the client 20 each exemplified by a television receiving device as shown in FIG. 1. Moreover, the description will be made with the setting information shared among devices also exemplified by the setting information of the television receiving device. The setting information of the television receiving device may be, for example, a variety of setting information such as the brightness value of a backlight of or the picture quality of a liquid crystal television. Moreover, the server device 10 and the client 20 may have different functions. The case where the functions are different may be a case where, due to the difference in manufacturer or model type between the devices, for example, the setting range from the minimum value to the maximum value in the setting information about the brightness value of the backlight of the liquid crystal television differs from each other.

In the present embodiment, settings can be appropriately shared between the server device 10 and the client 20 even when they have different functions, as described above. Moreover, as shown in FIG. 1, there may be a server-client type in which one of a plurality of television receiving devices is the server device 10 and the others are the clients 20. Moreover, in the case where a plurality of television receiving devices are connected via a network, and the settings of one of the television receiving devices is changed, the changed setting information may be shared among the other television receiving devices. In the following, there will be described the sharing of the setting information in the case where the one of the television receiving devices is the server device 10 and the other television receiving devices are the clients 20.

[3] Hardware Configuration of Server Device

The outline of the setting information sharing system 1 has been described above. Next, a hardware configuration of the server device 10 will be described with reference to FIG. 2. The server device 10 includes a CPU (Central Processing Unit) 101, a ROM (Read Only Memory) 102, a RAM (Random Access Memory) 103, a host bus 104, a bridge 105, an external bus 106, an interface 107, an input device 108, an output device 109, a storage device (HDD) 110, a drive 111, and a communication device 112.

Figure 2:
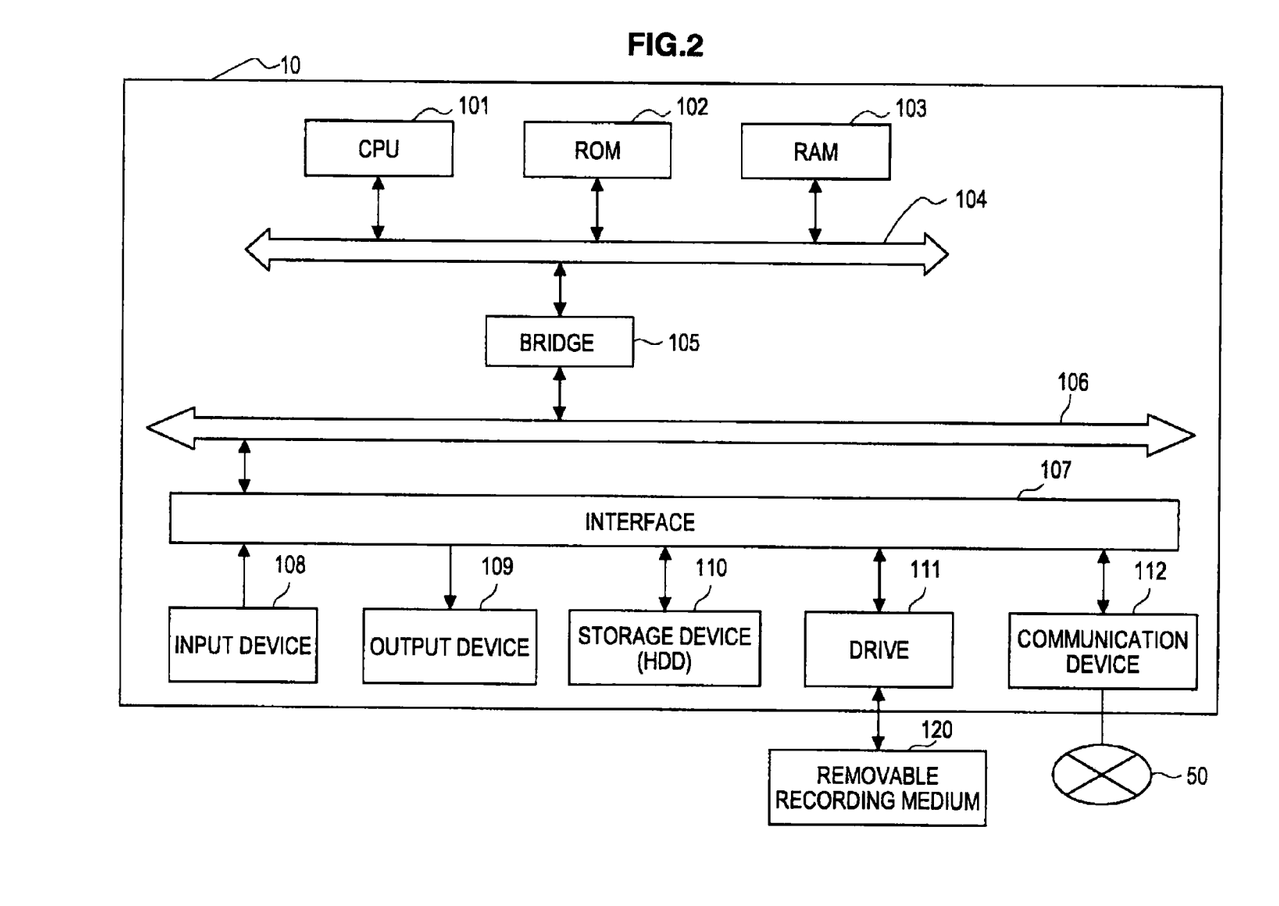
FIG. 2 is an explanatory diagram showing an example of a hardware configuration of a server device according to the embodiment.

The CPU 101 functions as an arithmetic processing device and a control device, and controls the overall operations within the server device 10 according to various types of programs. Moreover, the CPU 101 may be a microprocessor. The ROM 903 stores therein programs, calculation parameters and the like used by the CPU 101. The RAM 103 primarily stores therein programs executed by the CPU 101, parameters appropriately changing in the execution, and the like. These are interconnected via a host bus 104 including a CPU bus and the like.

The host bus 104 is connected to an external bus such as a PCI (Peripheral Component Interconnect/Interface) bus via the bridge 105. In addition, the host bus 104, the bridge 105 and the external bus 106 are not necessarily configured separately and their functions may be mounted on one bus.

The input device 108 includes an input means for inputting information by a user such as a mouse, a keyboard, a touch panel, a button, a microphone, a switch and a lever, and an input control circuit for generating an input signal and outputting the same to the CPU 101 based on the input by the user. The user of the server device 10 can input various types of data and give an instruction for performing processing operation to the server device 10 by operating the input device 108.

The output device 109 includes a display device such as a CRT (Cathode Ray Tube) display device, a liquid crystal display (LCD) device, OLED (Organic Light Emitting Display) device and a lamp, and an audio output device such as a speaker and a headphone. The output device 109 outputs reproduced contents, for example. Specifically, the display device displays various types of information such as reproduced video data in the form of text or image. On the other hand, the audio output device converts reproduced audio data into audio and outputs the same.

The storage device 110 is a data storage device configured as an example of a storage unit of the server device 10 and may include a storage medium, a recording device for recording data in the storage medium, a reading device for reading out the data from the storage medium, and a deletion device for deleting the data recorded in the storage medium. The storage device 110 is constituted by a HDD (Hard Disk Drive), for example. The storage device 110 drives a hard disk and stores therein programs and various types of data executed by the CPU 101.

The drive 111 is a reader/writer for storage medium and is built into or attached outside of the server device 10. The drive 111 reads out the information recorded in a removable recording medium 120 attached thereto such as a magnetic disk, an optical disk, a magnetooptical disk, or a semiconductor memory, and outputs the information to the RAM 103.

The communication device 112 is a communication interface constituted by a communication device for accessing a communication network 50, for example. Moreover, the communication device 112 may be a communication device designated for wireless LAN (Local Area Network), a communication device designated for wireless USB or a wire communication device for wire or cable communication. The communication device 112 transmits to and receives from the client 20, via the communication network 50, various data such as setting information.

The example of the hardware configuration of the server device 10 has been described above. Since the client 20 has substantially the same hardware configuration as that of the server device 10, the description of the client 20 is omitted.

[4] Functional Configuration of Server Device

Figure 3:
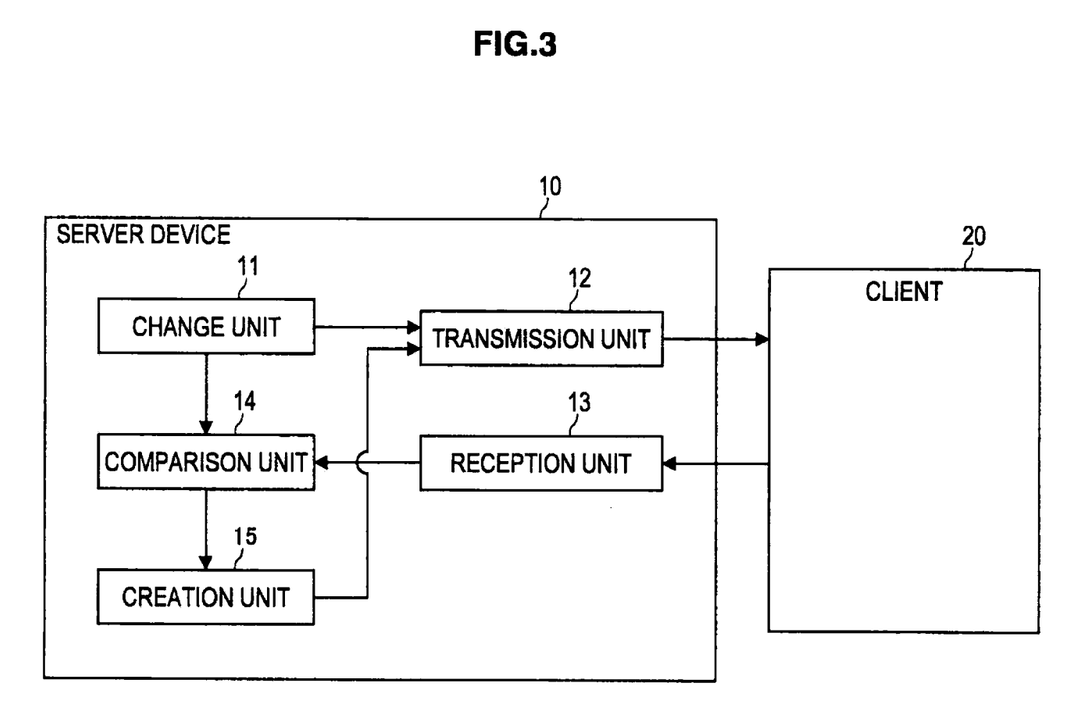
FIG. 3 is a block diagram showing an example of a configuration of the server device according to the embodiment.

Next, a functional configuration of the server device 10 will be described with reference to FIG. 3. FIG. 3 is a block diagram showing an example of a configuration of the server device 10. AS shown in FIG. 3, the server device 10 includes a change unit 11, a transmission unit 12, a reception unit 13, a comparison unit 14, and a creation unit 15.

The change unit 11 has a function of changing the setting information of a function of the server device 10. Here, the setting information can be exemplified by a variety of setting information such as the brightness value of a backlight of or the picture quality of a liquid crystal television, as described above. The setting information of the function changed by the change unit 11 is the setting information shared with the client 20. The change unit 11, when having changed the setting information of a function, notifies the transmission unit 12 that the setting information has been changed.

The transmission unit 12 has a function of transmitting to the client 20 a change notification of the setting information of the function when having received a notice that the setting information of the function has been changed by the change unit 11. The client 20 to which the change notification of the setting information of the function has been sent by the transmission unit 12 of the server device 10 transmits to the server device 10 the device information of the client 20.

The reception unit 13 has a function of receiving the device information of the client 20 to which the change notification of the setting information of the function has been sent by the transmission unit 12. Here, the device information of the client 20 received by the reception unit 13 may be exemplified, for example, by the information about the manufacturer (vendor information) and the information about the model type (model information) of the client 20.

The comparison unit 14 has a function of comparing the device information of the client 20 received by the reception unit 13 with the device information of the server device 10. As described above, when the vendor information and/or the model information are transmitted from the client 20 as the device information, they are compared with the vendor information and/or the model information of the server device 10.

The creation unit 15 has a function of creating a common file including the setting information of the function changed by the change unit 11, based on a comparison result of the server device 10 and the client 20 by the comparison unit 14. The creation unit 15 provides the created common file to the transmission unit 12. The transmission unit 12 transmits to the client 20 the common file provided by the creation unit 15.

The creation unit 15 creates the common file corresponding to a setting level determined based on the comparison result of the device information by the comparison unit 14. The setting level described here includes a setting level common among the same device models, a setting level common among devices of the same vendor, or a setting level common among the same device models. For example, when the server device 10 and the client 20 are the devices of the same vendor but are of different device models, there is created the common file corresponding to a setting level common among different devices or a setting level common among the same device models.

Figure 4:
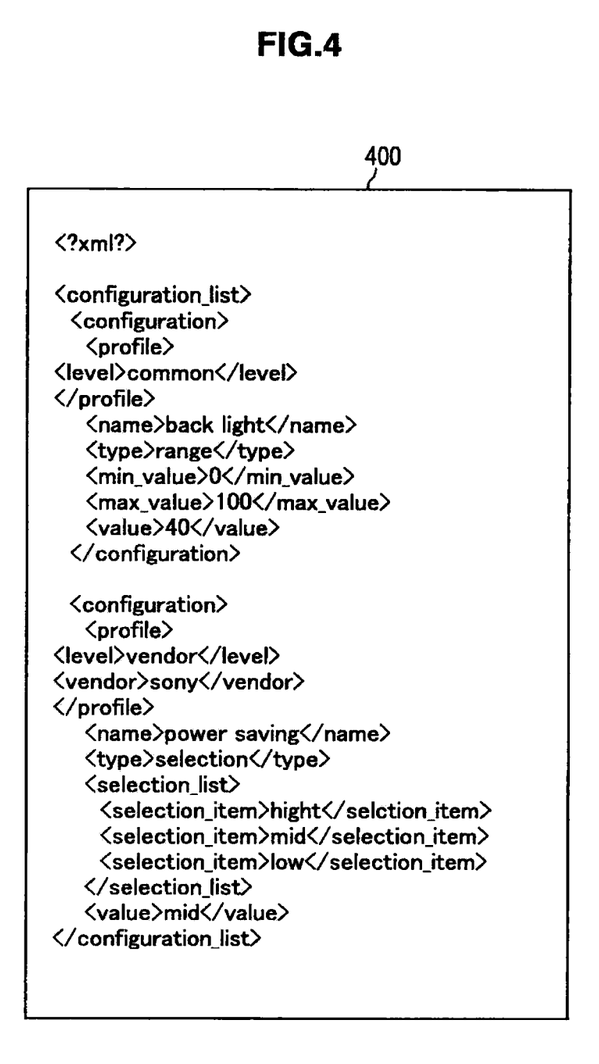
FIG. 4 is an explanatory diagram for explaining a common file according to the embodiment.

Here, the common file created by the creation unit 15 will be described with reference to FIG. 4. In FIG. 4, there is described a case where the common file is created by describing in XML the setting information of the function which has been changed by the change unit 11. FIG. 4 is an explanatory diagram for explaining a description example of the common file created in XML.

As shown in XML 400 in FIG. 4, a <configuration_list> node is a root node of the XML. A plurality of <configuration> nodes can be described under the <configuration_list> node. Information about one setting item is described in a <configuration> node. A <profile> node, a <name> node, a <type> node, a <value> node can be described under the <configuration> node.

The <profile> node indicates a description level of a setting value. The <name> node identifies the setting value. The <type> node indicates a type of the setting value. The <value> node indicates the setting value. There can be further described in the <type> node, a range type (back light) in which a range from the minimum value to the maximum value can be set, or a selection type (power saving) in which the setting value is set by selecting from a plurality of options.

Figure 5:
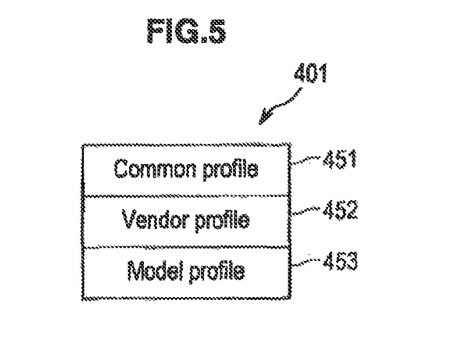
FIG. 5 is an explanatory diagram for explaining a description level of a setting value according to the embodiment.

The above-described <profile>indicates a description level of the setting value. An example in which the description levels 401 of the setting value are classified into three profiles will be described as shown in FIG. 5, for example. In a common profile 451, a setting function included in all the television devices is defined. In a vendor profile 452, a vendor uses a common definition for a unique function of the vendor developing television devices. Furthermore, in a model profile 453, difference of the settings between each model of the vendor is defined.

The classification of the profiles is described in a <level> node under the <profile> node. If the description level is classified as a vendor profile, vendor information is described in a <vendor> node, and if the description level is classified as a model profile, model information is described in a <model> node.

That is, by profiling various description levels in this manner, settings can be shared even among devices of different manufacturers as long as the devices are compatible with the common profile. Moreover, by letting devices compatible with the vendor profile defined by each manufacturer, settings can be shared by devices of each of the manufacturer. Furthermore, in the case where fine settings per model are desired, it is possible to define the model profile and to make devices of each model compatible with the model profile.

Description will be made referring again to FIG. 3. The client 20 who has received the common file described above from the server device 10 optimizes the setting information of the function of the client 20 based on the changed setting information of the function which is included in the common file. Optimization of the setting information of the function in the client 20 will be described in detail later.

[5] Setting Information Sharing Method

Figure 6:
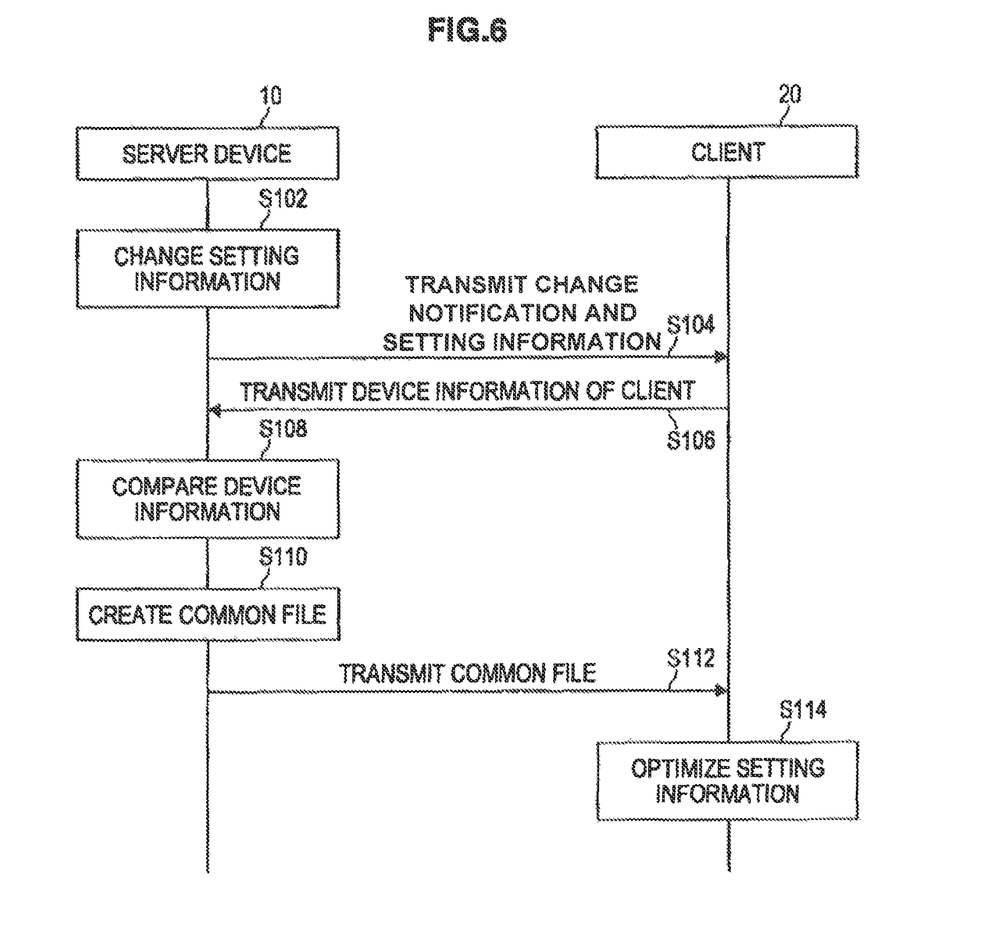
FIG. 6 is an explanatory diagram for explaining a setting information sharing method according to the embodiment.

The functional configuration of the server device 10 has been described above. Next, a setting information sharing method will be described. FIG. 6 is an explanatory diagram for explaining the setting information sharing method. As shown in FIG. 6, first in step S102, the change unit 11 of the server device 10 changes setting information of a function. Next, in step S104 the transmission unit 12 transmits a change notification and transmits the setting information of the function which has been changed to the client 20.

Then in step S106, the device information of the client 20 is transmitted from the client 20. In step S108 the comparison unit 14 of the server device 10 compares the device information of the client 20 transmitted from the client 20 with the device information of the server device 10.

The creation unit 15 creates a common file in step S110 corresponding to the setting level defined based on a comparison result of the pieces of device information which have been compared. In step S112 the transmission unit 12 of the server device 10 transmits to the client 20 the common file previously created.

In step S114 the client 20 to which the common file has been transmitted optimizes the setting information of the function of the client 20 based on the changed setting information of the function which is included in the common file.

Figure 7:
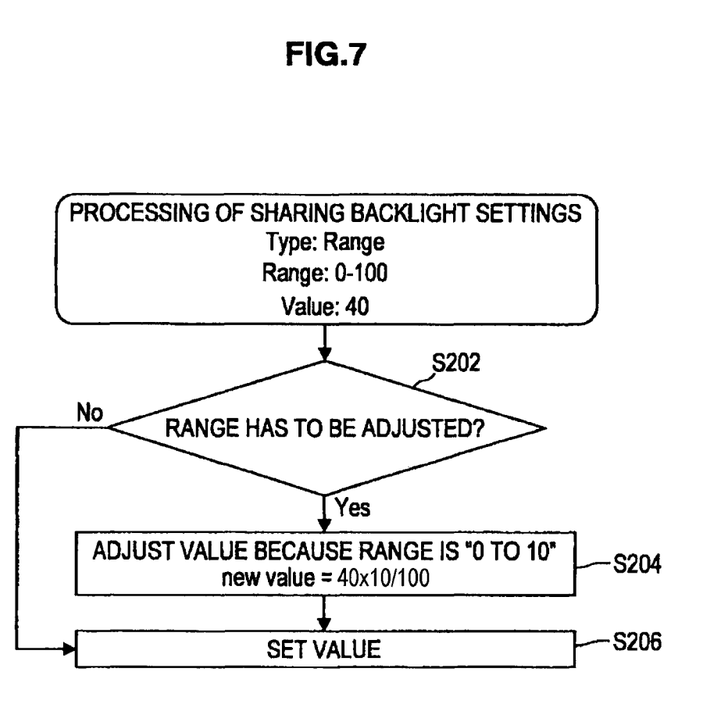
FIG. 7 is an explanatory diagram for explaining optimization of the setting information of a function of a client according to the embodiment.

Next, the optimization, at the step S114, of the setting information of the function of the client 20 having received the common file will be described with reference to FIG. 7. FIG. 7 is a flowchart showing the optimization of the setting information of the function in the client 20. In FIG. 7, sharing of backlight settings is described as the sharing of the setting information of a function. In a common file 400 described in XML shown in FIG. 4, a setting value (back light) indicating a brightness value of a backlight of a liquid crystal display is described as a common profile.

As shown in FIG. 4, the settings of a backlight (back light) in the common file 400 are defined as "the minimum value 0, the maximum value 100" (Type: Range, Range: 0 to 100). In addition, the setting value of the backlight has to be set to "40" (Value: 40). On the other hand, in the client 20, it is premised that the settings of a backlight is defined as "the minimum value 0, the maximum value 10".

Referring now back to FIG. 7, in the case described above, the client 20 having received the common file 400 first determines in step S202 whether the range has to be adjusted. In the example described above, the range (the minimum value, the maximum value) in the client 20 differs from that in the common file 400, so that it is judged at the step S202 that the range has to be adjusted.

In the case that it is judged at the step S202 that the range has to be adjusted, the range set in the common file is adjusted to the range in the client 20, and a new setting value is calculated (S204). For example, as described above, in the case where the range set in the common file is "0 to 100" and the range in the client 20 is "0 to 10", the setting value "40" of the backlight is reset by "40×10/100".

Then, the value which has been set at the step S204 is set as the setting value of the backlight of the client 20 (S206). In this manner, settings can be shared even among devices of different manufacturers as long as the devices are compatible with the common profile. The setting information sharing method has been described above.

According to the embodiment described above, the server device transmits to the client the setting information of the function which has been changed by the server device and receives the device information from the client. Then, the server device compares the device information of the client with the device information of the server device and can create, based on the comparison result of the device information, the common file including the changed setting information of the function. The common file is created according to the setting level common among different devices, the setting level common among the devices of the same vendor, or the setting level common among the same device models. This enables the sharing of the setting information even among devices having different functions. Moreover, settings per vendor can be shared among devices of the same vendor, and settings per model can be shared among the same models.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the embodiment described above, it is premised that the setting information of a function is shared via the network 50, but the present invention is not limited to the example. For example, setting information may be shared among devices by storing the setting information of a function in an external memory device and using the stored setting information of the function. In this case, the external memory device stores therein the common file created by all of the common profile, the vendor profile, and the model profile described above. Then, the devices for sharing the setting information of the function loads the common file stored in the external memory and optimizes the setting information of the function by selecting an optimal description level based on their own device information.

The present application contains subject matter related to that disclosed in Japanese Priority Patent Application JP 2009-061774 filed in the Japan Patent Office on Mar. 13, 2009, the entire content of which is hereby incorporated by reference.

What is claimed is:

1. A server device comprising:
a processor; and
a storage device having stored thereon units executable by the processor, the units comprising:
a change unit for changing setting information of a function shared with a client connected via a network;
a transmission unit for transmitting to the client a change notification of the setting information of the function when the setting information of the function has been changed by the change unit;
a reception unit for receiving, from the client, device information of the client to which the change notification of the setting information of the function has been transmitted from the transmission unit;
a comparison unit for comparing the device information of the client received by the reception unit with device information of the server device; and
a creation unit for creating, based on a comparison result of the device information by the comparison unit, a common file including the changed setting information of the function,
wherein
the common file includes setting information of the function for a plurality of different device types or for a plurality of different device manufacturers, and
the transmission unit transmits to the client the common file created by the creation unit.

2. The server device according to claim 1, wherein the client optimizes the setting information of the function of the client based on the changed setting information of the function which is included in the common file transmitted from the transmission unit.

3. The server device according to claim 1, wherein the creation unit creates the common file corresponding to a setting level defined based on the comparison result of the device information by the comparison unit.

4. The server device according to claim 3, wherein the setting level includes a setting level common among different devices, a setting level common among devices of the same vendor, or a setting level common among the same device models.

5. The server device according to claim 1, wherein the creation unit describes the changed setting information of the function in XML and creates the common file.

6. The server device according to claim 5, wherein the creation unit describes the setting level in a profile node of XML.

7. The server device according to claim 1, wherein the setting information comprises setting values for at least one of backlight brightness or picture quality.

8. The server device according to claim 2, wherein the client optimizes the setting information based on a ratio of a client setting value range to a setting value range stored at the server device.

9. The server device according to claim 6, wherein the setting level descriptions are a common profile, a vendor profile, or a model profile.

10. A setting information sharing method comprising the steps of:
changing setting information of a function shared with a client connected via a network;
transmitting to the client a change notification of the setting information of the function when the setting information of the function has been changed by the step of changing the setting information;
receiving from the client setting information of a function of the client corresponding to the setting information of the function which has been transmitted;
comparing the changed setting information of the function with the setting information of the function of the client;
creating a common file including the changed setting information of the function in the case where the changed setting information of the function and the setting information of the function of the client are different as a result of comparison at the step of comparing; and
transmitting the created common file to the client
wherein
the common file includes setting information of the function for a plurality of different device types or for a plurality of different device manufacturers.

11. The method according to claim 10, further comprising optimizing the setting information of the function of the client based on the changed setting information of the function which is included in the common file transmitted from the transmission unit.

12. The method according to claim 11, wherein the client optimizes the setting information during the step of optimizing by scaling the setting information according to a ratio of a client setting value range to a common file setting value range.

13. A non-transitory computer-readable storage medium having stored thereon instructions that when executed by a processor cause a computer to perform a method comprising:
changing setting information of a function shared with a client connected via a network;
transmitting to the client a change notification of the setting information of the function when the setting information of the function has been changed by the change unit;
receiving from the client device information of the client to which the change notification of the setting information of the function has been transmitted from the transmission unit;
comparing the device information of the client received by the reception unit with device information of the server device;
creating, based on a comparison result of the device information by the comparison unit, a common file including the changed setting information of the function; and
transmitting to the client the common file created by the creation unit,
wherein
the common file includes setting information of the function for a plurality of different device types or for a plurality of different device manufacturers.

* * * * *